United States Patent [19]

Gjota

[11] Patent Number: 4,710,661

[45] Date of Patent: Dec. 1, 1987

[54] WINDING ARRANGEMENT OF A STATOR AND/OR ROTOR OF A THREE-PHASE GENERATOR OR ELECTROMOTOR WITH IMPROVED PERFORMANCES

[76] Inventor: Rifat Gjota, Titogradska 19, YU-38300 Pe , Yugoslavia

[21] Appl. No.: 944,063

[22] Filed: Dec. 22, 1986

[51] Int. Cl.⁴ .............................................. H02K 3/00
[52] U.S. Cl. ..................................... 310/198; 312/184
[58] Field of Search ............... 310/179, 180, 184, 185, 310/187, 188, 195, 198, 199, 203–208

[56] References Cited

U.S. PATENT DOCUMENTS

| | | | |
|---|---|---|---|
| 3,413,717 | 12/1968 | Peters | 310/184 X |
| 3,949,254 | 4/1976 | Woll et al. | 310/198 |
| 4,117,390 | 9/1978 | Iwata et al. | 310/198 X |
| 4,138,619 | 2/1979 | Broadway et al. | 310/198 X |
| 4,403,160 | 9/1983 | Hibino | 310/184 X |
| 4,528,472 | 7/1985 | Auinger | 310/198 |

Primary Examiner—Mark O. Budd
Attorney, Agent, or Firm—Fleit, Jacobson, Cohn & Price

[57] ABSTRACT

Winding arrangement of a stator and/or rotor of a three-phase generator or electromotor makes possible an improvement of all performances of these electric machines. The improvement is obtained in that to star-connected windings there are connected additional delta-connected windings, which in relation to the star-connected windings are spatially shifted for an angle of $(\pi/2p) \pm (\pi/6p)$, p being the number of pole pairs. Such a winding arrangement is symbolically expressed by $Y + j\Delta = \triangle$.

2 Claims, 16 Drawing Figures

WINDING ARRANGEMENT OF A STATOR AND/OR ROTOR OF A THREE-PHASE GENERATOR OR ELECTROMOTOR WITH IMPROVED PERFORMANCES

The invention relates to the field of spatial positioning and mutual connecting of windings of the stator and/or the rotor at three-phase electric machines.

In known three-phase generators or electromotors the windings of the stator and/or rotor have been star-connected or delta-connected.

As the performances of known machines are not satisfactory, it was the aim of the inventor to improve these performances without changing the technology of the production of the machines.

This aim was achieved by a novel arrangement of the windings of the stator and/or the rotor of a three-phase generator or electromotor, whereat into the stator and/or rotor there are installed star-connected and delta-connected windings, which are mutually shifted in the space for an angle of $(\pi/2p)\pm(\pi/6p)$, p being the number of pole pairs.

To make the object of the invention better understandable, there is first shown graphically and analytically how a rotating magnetic field is acquired at known three-phase electric machines.

Figure 1:
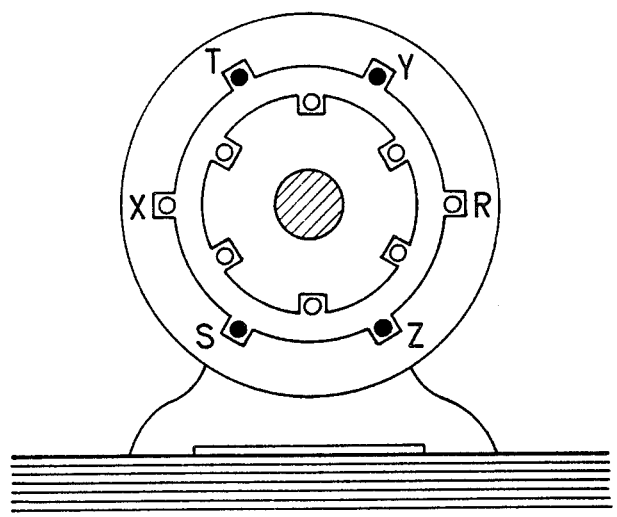

In FIG. 1 there is shown the cross-section of a known three-phase electric machine, at which the turns marked R-X are positioned in a horizontal plane and the other turns S-Y and T-Z are spatially shifted for an angle of $(2\pi/3p)$ in relation to the turns R-X, the number of pole pairs being $p=1$ and them being star-connected or delta-connected.

Through these turns there flow currents that are also mutually shifted for $(2\pi/3)$ and form the following induction components:

$$B_r = B_m \cdot \sin\left(\frac{2\pi}{\lambda} x\right) \cdot \sin(wt)$$

$$B_s = B_m \cdot \sin\left(\frac{2\pi}{\lambda} x - \frac{2\pi}{3}\right) \cdot \sin\left(wt - \frac{2\pi}{3}\right)$$

$$B_t = B_m \cdot \sin\left(\frac{2\pi}{\lambda} x - \frac{4\pi}{3}\right) \cdot \sin\left(wt - \frac{4\pi}{3}\right)$$

Based on the Leblanc theorem, after the transformation there is obtained:

$$B_r = \tfrac{1}{2} B_m \left[\cos\left(\frac{2\pi}{\lambda} x - wt\right) - \cos\left(\frac{2\pi}{\lambda} x + wt\right)\right]$$

$$B_s = \tfrac{1}{2} B_m \left[\cos\left(\frac{2\pi}{\lambda} x - wt\right) - \cos\left(\frac{2\pi}{\lambda} x + wt - \frac{4\pi}{3}\right)\right]$$

$$B_t = \tfrac{1}{2} B_m \left[\cos\left(\frac{2\pi}{\lambda} x - wt\right) - \cos\left(\frac{2\pi}{\lambda} x + wt - \frac{8\pi}{3}\right)\right]$$

By the addition of the foregoing expressions there is obtained a resulting vector of the rotating magnetic field:

$$B_{rot} = B_r + B_s + B_t$$

$$B_{rot} = \frac{3}{2} B_m$$

Figure 2:
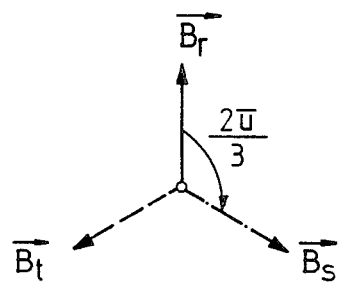
Figure 3:
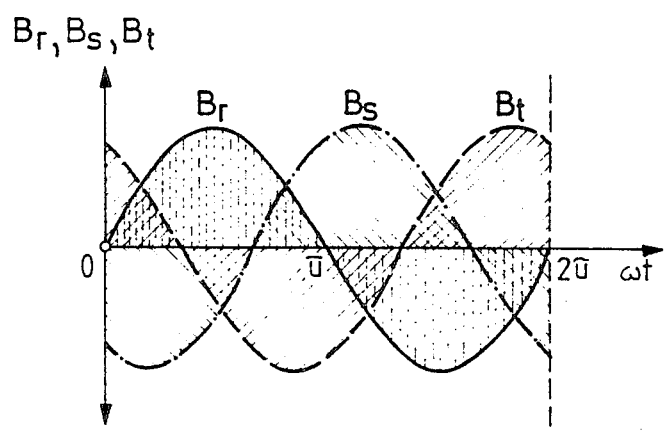
Figure 4:
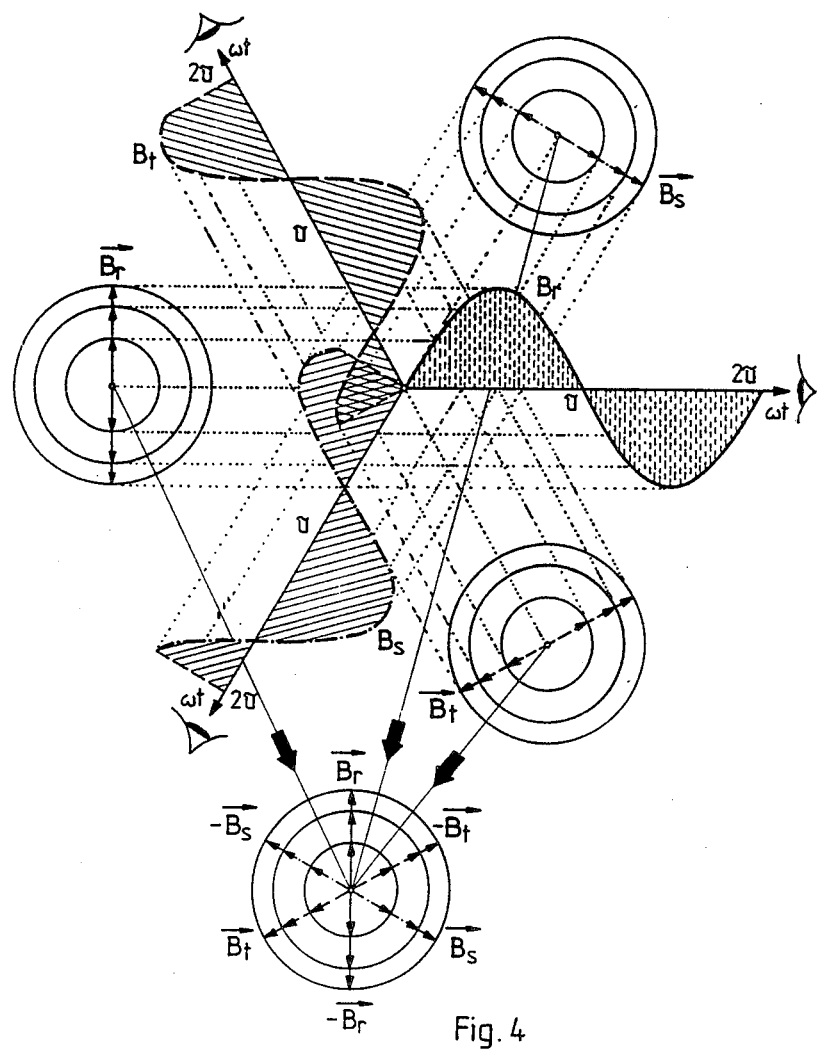

FIG. 2 shows the vector diagram of single phase inductions $B_r$, $B_s$, $B_t$ and FIG. 3 shows the functions of their intensity in the course of time. FIG. 4 shows the functions from FIG. 3 shifted in space for $(2\pi/3p)$ ($p=1$). The contribution of each phase for each $(\pi/6)$ (1.66 ms) to the resulting magnetic field is shown in FIG. 5.

Figure 5:
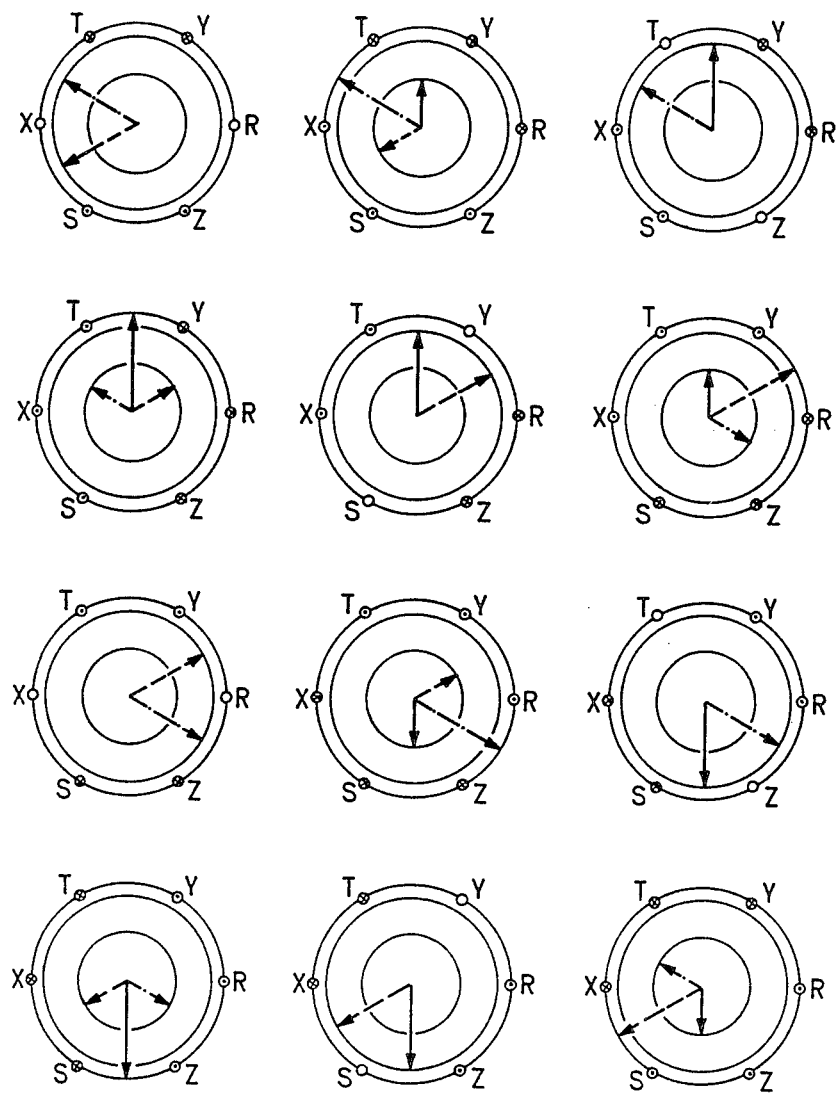
Figure 6:
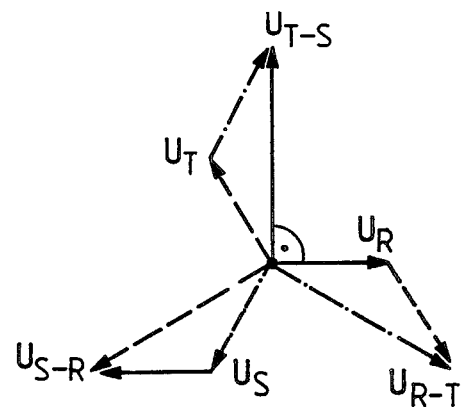
Figure 7:
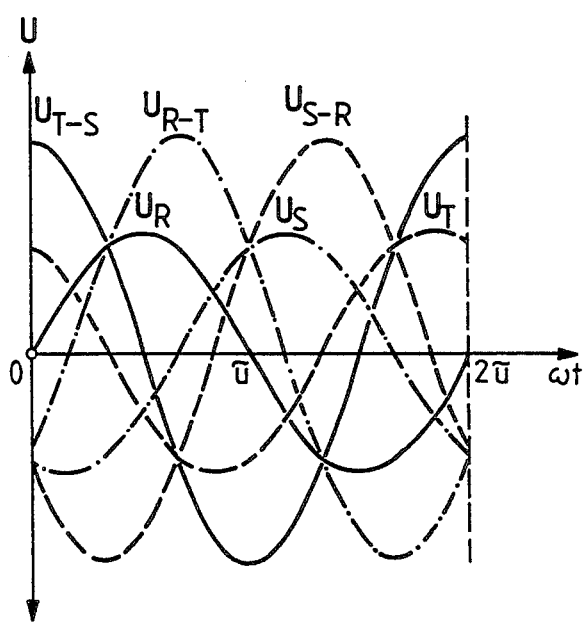
Figure 8:
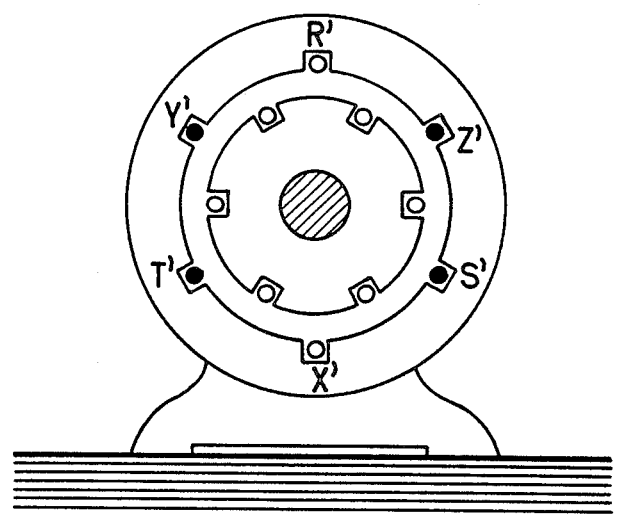
Figure 9:
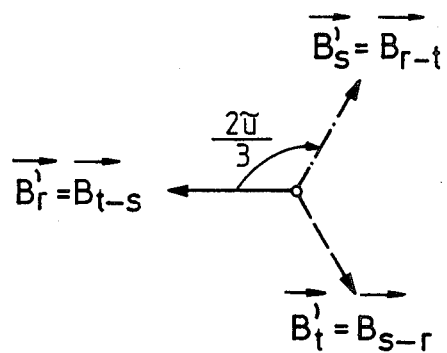
Figure 10:
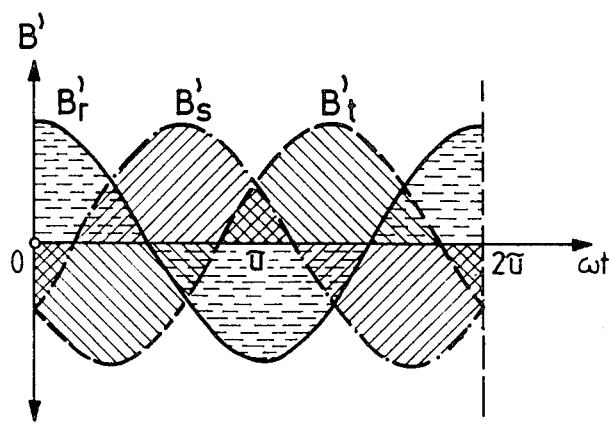
Figure 11:
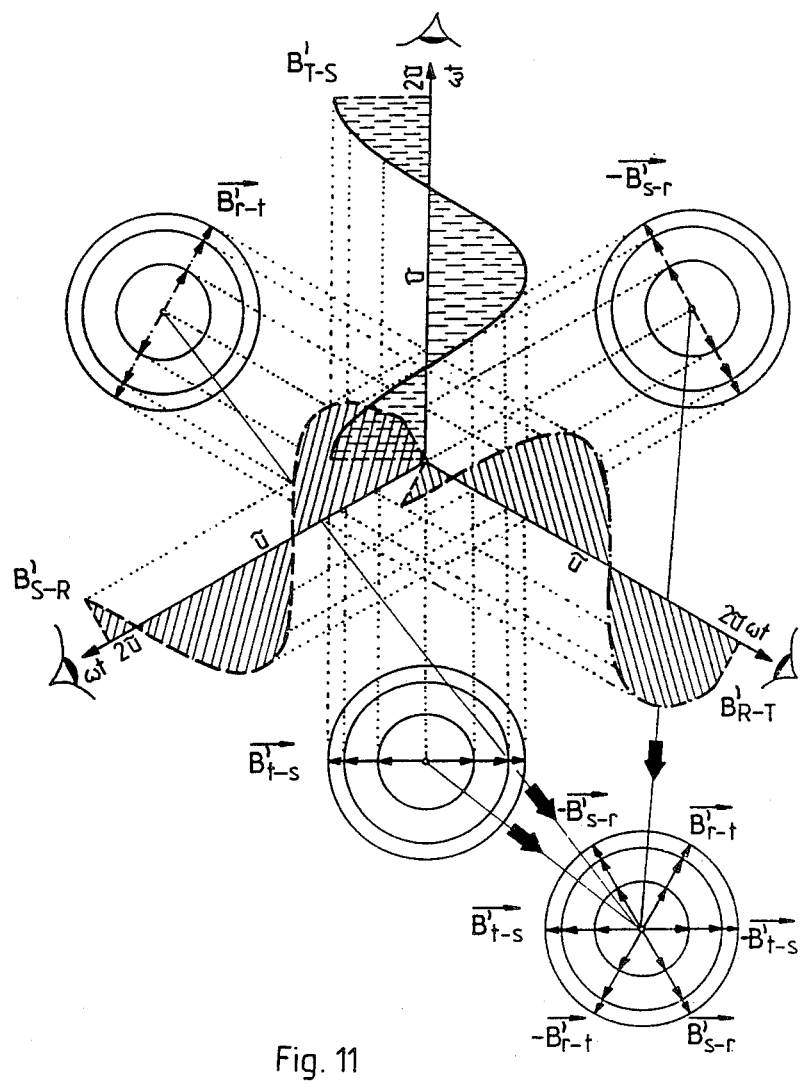
Figure 12:
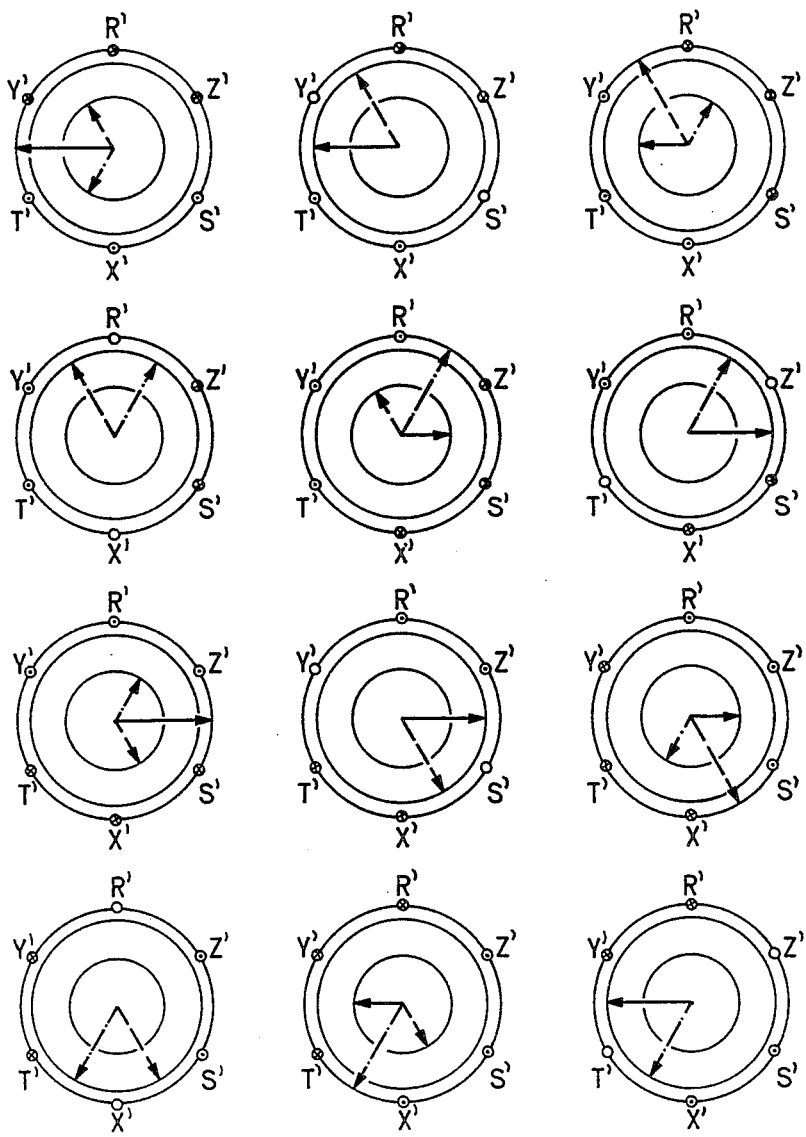
Figure 13:
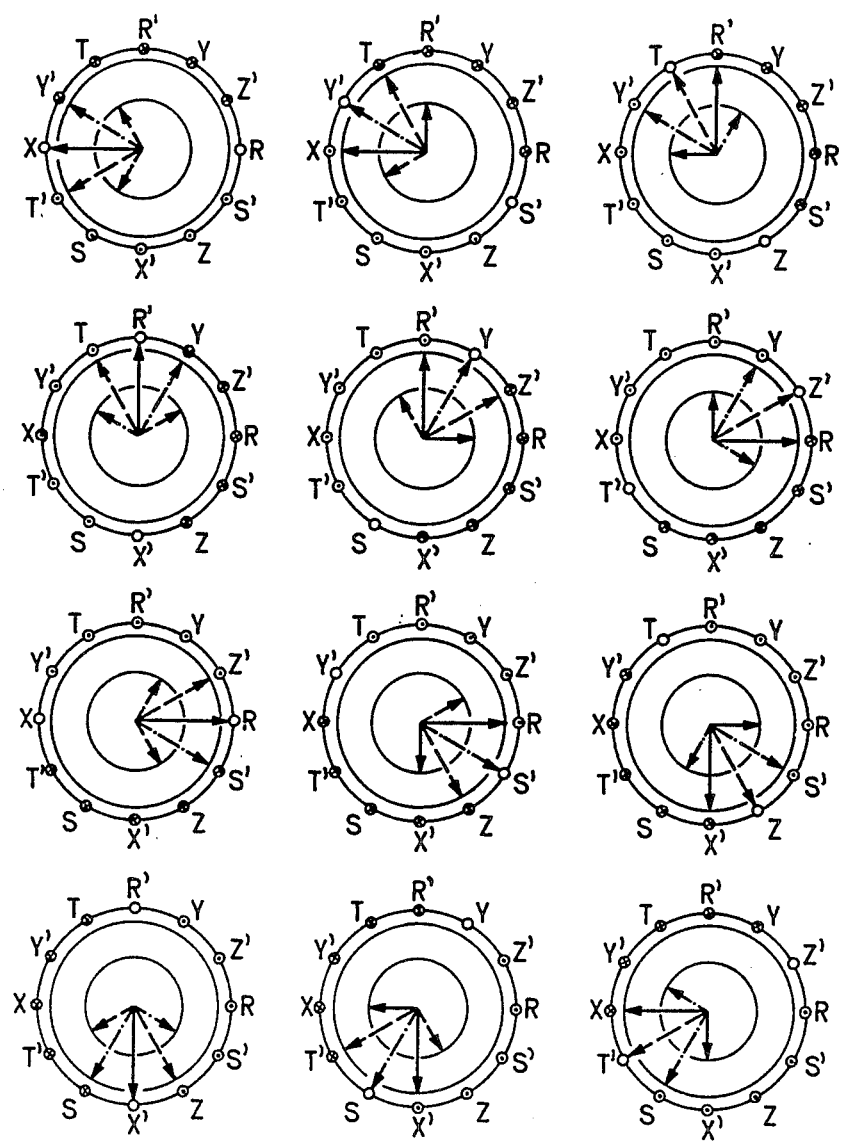
Figure 14:
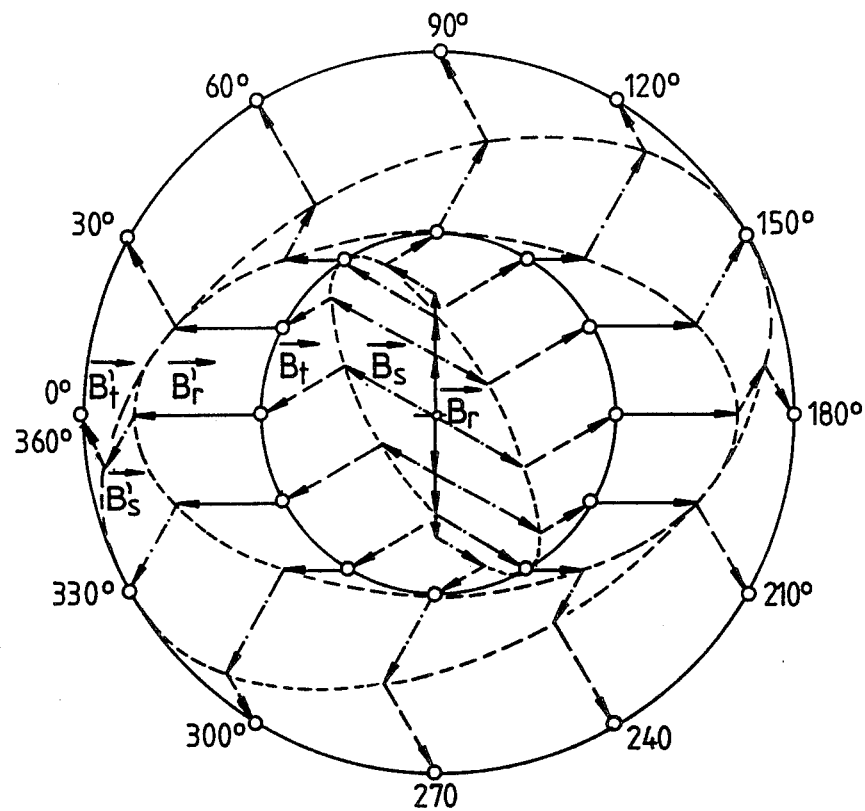
Figure 14:
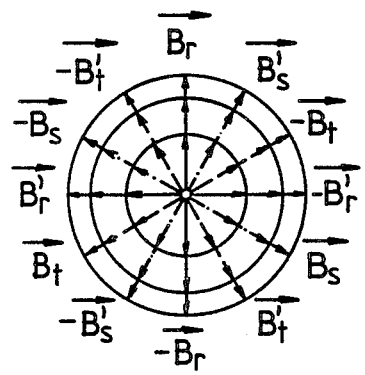
Figure 15:
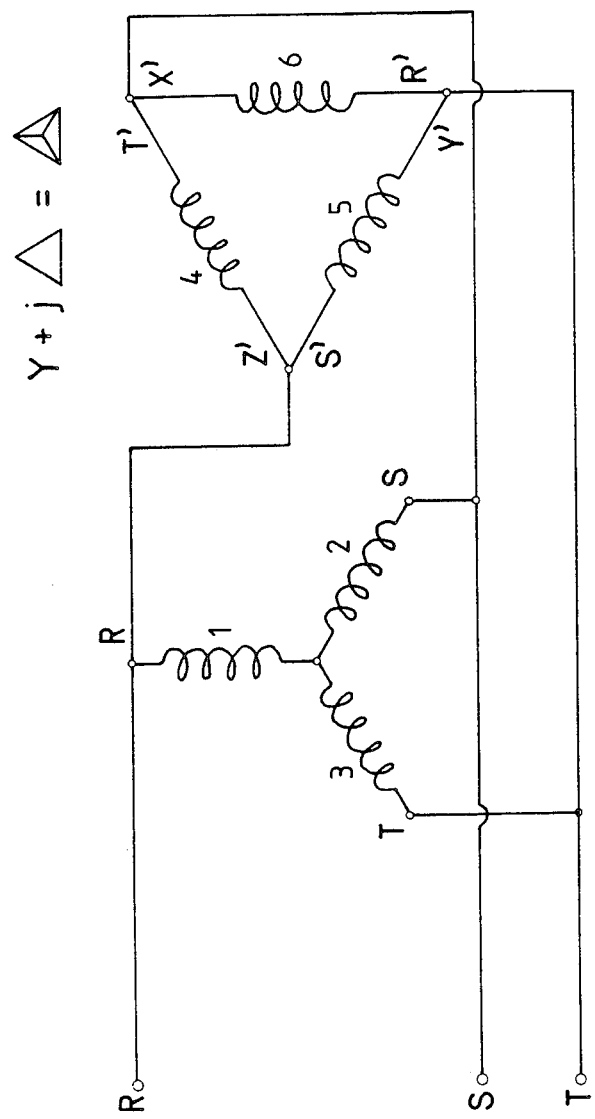
Figure 16:
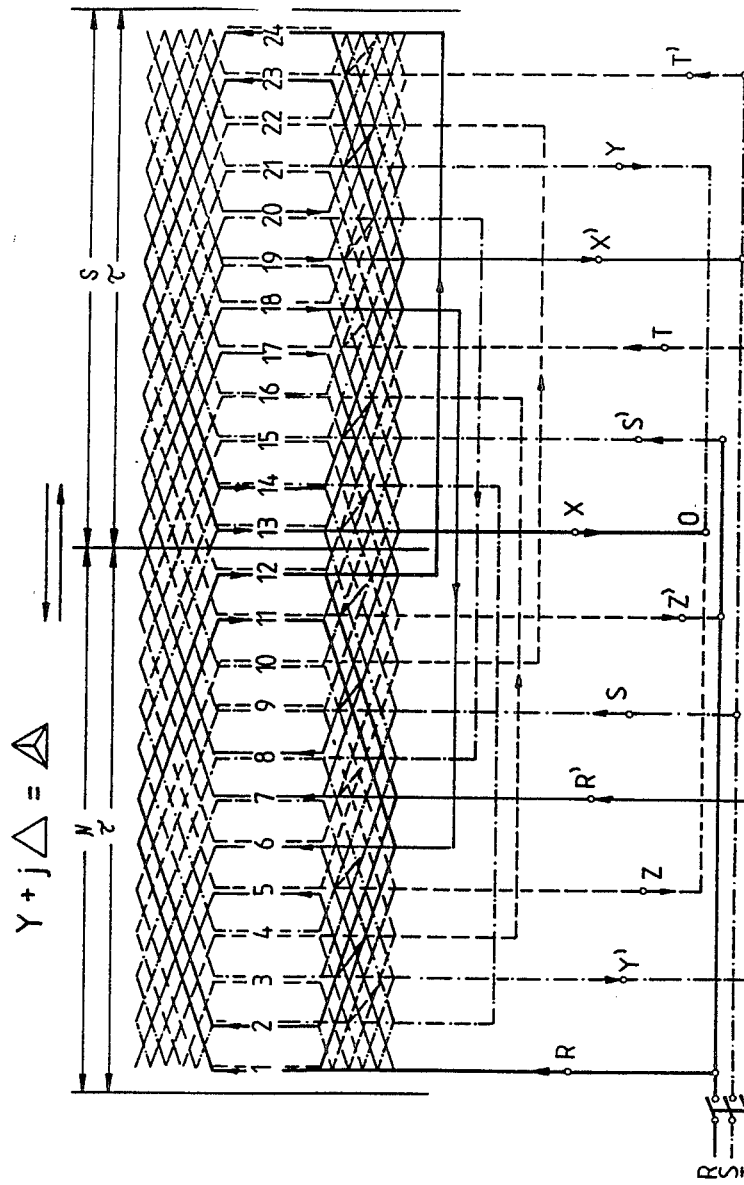

In FIGS. 4 and 5 it can be noted that in each second observed situation one of the phases does not contribute to the resulting field, in fact for each $(\pi/3)$ (3.33 ms). In order to avoid this disadvantage, it was necessary to introduce a new rotating magnet field. The manner of forming this new rotating magnetic field representing a complement to the existing rotating magnet field is described in the continuation of this application and explained by the drawings which show:

FIG. 6 the vector diagram,

FIG. 7 the functions of phase and line voltages,

FIG. 8 the cross-section through a three-phase electric machine at which the turns are shifted for $(\pi/2p)$ ($p=1$) in relation to the electric machine from FIG. 1, FIG. 9 the vector diagram of single functions of the phases $B_r'$, $B_s'$, $B_t'$ of the new rotating magnetic field, and FIG. 10 the functions of their intensities shifted for $(\pi/2p)$ ($p=1$) in the time function, FIG. 11 the functions from FIG. 10 shifted in space for $(2\pi/3p)$ ($p=1$), FIG. 12 the contributions of single functions of the new rotating magnetic field for each $(\pi/6)$ in relation to the resulting rotating field, FIG. 13 the covering of the resulting vector of the previous rotating magnetic field shown in FIG. 5 and of the resulting vector of the new rotating magnetic field shown in FIG. 12, FIG. 14 the resulting aggregate rotating magnetic field composed of the previous and new (complementary) resulting rotating magnetic fields, FIG. 15 the diagram of the winding connection according to the invention, FIG. 16 an embodiment of a winding scheme according to the invention.

It is visible in FIGS. 6 and 7 that at the moment when the R-phase voltage is zero, the line voltage T-S is maximum and the two voltages are perpendicular to each other. In FIG. 8 there is shown a cross-section of a three-phase electric machine at which the turns are shifted for $(\pi/2p)$ ($p=1$) in relation to the electric machine from FIG. 1. The induction of the new field is shown mathematically by the following equations:

$$B_r' = B_m \sin\left(\frac{2\pi}{\lambda} x + \frac{\pi}{2p}\right) \sin\left(wt + \frac{\pi}{2}\right)$$

$$B_s' = B_m \sin\left(\frac{2\pi}{\lambda} x + \frac{\pi}{2p} - \frac{2\pi}{3}\right) \sin\left(wt + \frac{\pi}{2} - \frac{2\pi}{3}\right)$$

$$B_t' = B_m \sin\left(\frac{2\pi}{\lambda} x + \frac{\pi}{2p} - \frac{4\pi}{3}\right) \sin\left(wt + \frac{\pi}{2} - \frac{4\pi}{3}\right)$$

When p=1 and the Leblanc transformation is applied:

$$B_r' = \frac{B_m}{2}\left[\cos\left(\frac{2\pi}{\lambda}x - wt\right) + \cos\left(\frac{2\pi}{\lambda}x + wt\right)\right]$$

$$B_s' = \frac{B_m}{2}\left[\cos\left(\frac{2\pi}{\lambda}x - wt\right) + \cos\left(\frac{2\pi}{\lambda}x + wt - \frac{4\pi}{3}\right)\right]$$

$$B_t' = \frac{B_m}{2}\left[\cos\left(\frac{2\pi}{\lambda}x - wt\right) + \cos\left(\frac{2\pi}{\lambda}x + wt - \frac{8\pi}{3}\right)\right]$$

By the addition of the above definition there is obtained the resulting vector of the novel rotating magnetic field:

$$B'_{rot} = B'_r + B'_s + B'_t$$

$$B'_{rot} = \frac{3}{2} B_m$$

FIG. 9 shows the vector diagram of single inductions of phases $B_r'$, $B_s'$, $B_t'$ in a three-phase electric machine shown in FIG. 8. The intensities of said inductions are shown in FIG. 10 and in FIG. 11 they are shown shifted in space for $(2\pi/3p)$ (p=1), but in relation to FIG. 4 they are suited for $(\pi/2p)$ (p=1). In FIG. 12 there are shown contributions of single inductions of the new rotating magnetic field for each $(\pi/6)$ to the resulting rotating magnetic field. In FIG. 13 there is visible the covering of the resulting vector of the previous rotating magnetic field shown in FIG. 5 and of the resulting vector of the novel rotating magnetic field shown in FIG. 12. In FIG. 14 there is shown the resulting aggregate rotating magnetic field composed of the previous and the novel (complementary) resulting rotating magnetic field.

On the basis of the above explanations it can be seen that the windings of a stator and/or rotor of a three-phase generator or electromotor according to the invention comprise star-connected and delta-connected windings being mutually spatially shifted for an angle $(\pi/2p)$, where p is the number of pole pairs. This angle can be varied for $\pm(\pi/6p)$ so that the invention can be exploited at different slot numbers. The electric connection diagram is shown in FIG. 15 and FIG. 16 shows the scheme of an embodiment of winding and connecting the windings at Z=24 slots and p=1. In the same slots the star-connected and the delta-connected windings can be positioned.

Such an embodiment of the winding is symbolically expressed as $$Y + j\Delta = \triangle$$

I claim:

1. Winding arrangement of a stator and/or rotor of a three-phase generator or electromotor with improved performances, characterized in that into the stator and/or rotor of a generator or electromotor there are installed star-connected and delta-connected windings that are mutually shifted in the space for an angle of $(\pi/2p) \pm (\pi/6p)$, p being the number of pole pairs.

2. Arrangement according to claim 1, characterized in that the end connections (X, Y, Z) of the windings (1, 2, 3) are star-connected, that the windings (4, 5, 6) are delta-connected, that the starting connection (R) of the winding (1) is connected to the connection point of the connections (S', Z') of the windings (4, 5), that the starting connection (S) of the winding (2) is connected to the connection point of the connections (X', T') of the windings (4, 6), that the starting connection (T) of the winding (3) is connected to the connection point of the connections (Y', R') of the windings (5, 6), that the connection point of the phase (R) is connected to the connection point of the connections (R, S', Z'), that the connection point of the phase (S) is connected to the connection point of the connections (S, X', T') and that the connection point of the phase (T) is connected to the connection point of the connections (T, Y', R').

* * * * *